July 31, 1945.   R. R. PROCTOR   2,380,705
VARIABLE SENSITIVITY CONTROL VALVE
Filed June 20, 1942
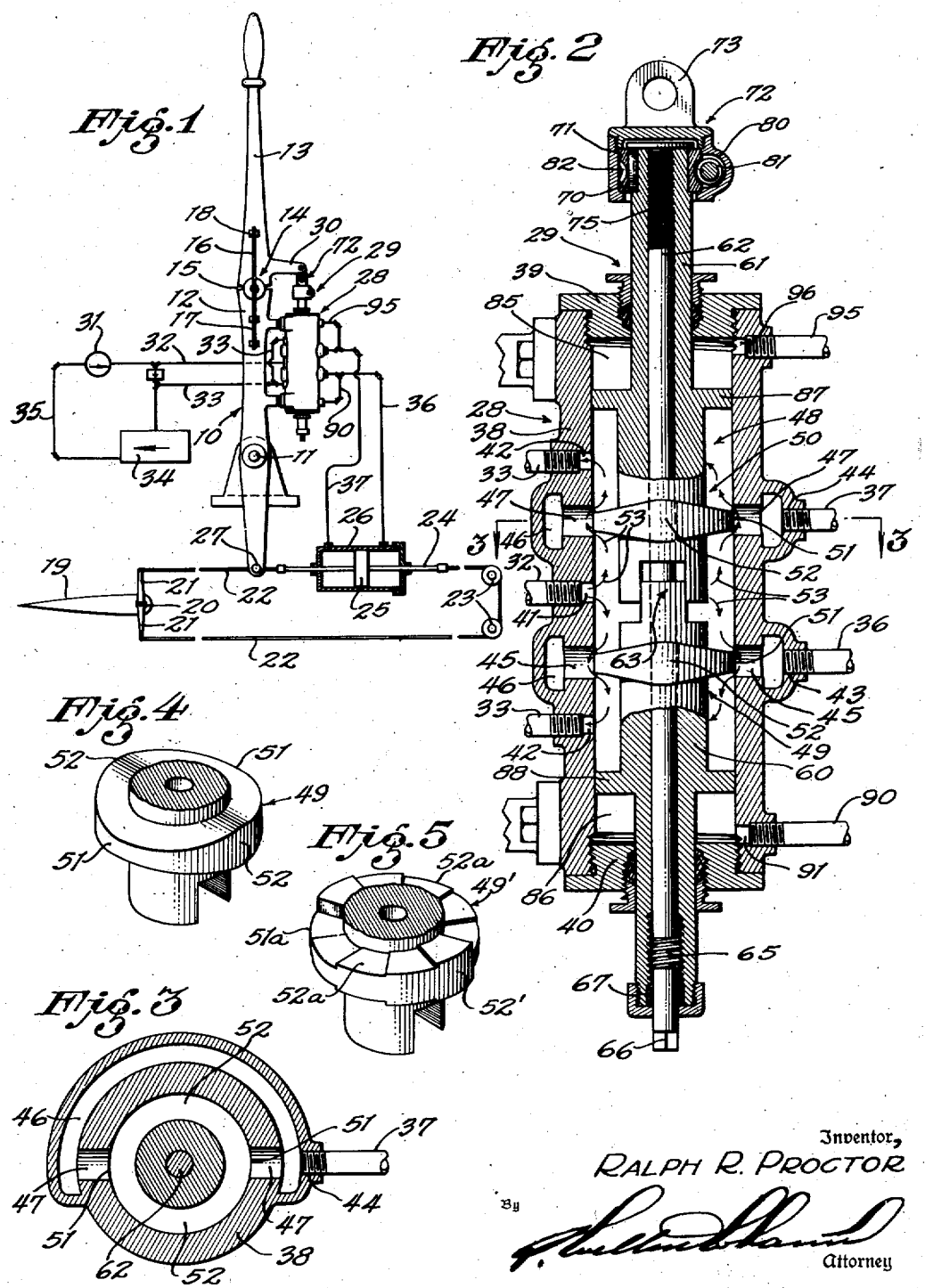
Inventor,
RALPH R. PROCTOR Patented July 31, 1945

2,380,705

UNITED STATES PATENT OFFICE 2,380,705

VARIABLE SENSITIVITY CONTROL VALVE

Ralph R. Proctor, Glendale, Calif.

Application June 20, 1942, Serial No. 447,779

12 Claims. (Cl. 121—46.5)

My invention relates in general to pressure systems, and in particular to an adjustable selector or control valve for use in hydraulic, fluid, gas and vapor pressure or vacuum systems for controlling or obtaining universal aiming movements of guns, universal movement of gun turrets, movements of cranes, earth loading and moving machinery, tractors, trucks, tanks, valves and movement of various operative parts, in different types of mechanisms, including the control and movement of control surfaces of aircraft. The terms, "hydraulic," and "fluids" as used hereafter shall be understood to include any means of transmitting force or energy by use of fluids, gases or vapors under pressure or vacuum.

It is an object of my invention to provide a simple hydraulic system wherein a control member, such as a lever, is moved in accordance with the movement desired for an operator part or mechanism by a hydraulic motivating means, this hydraulic system including an adjustable valve operated by the control member so as to control the delivery of motivating fluid from the source of fluid under pressure to the motivating means.

It is an object of the invention to provide a control valve for use in hydraulic systems, this control valve having means for adjusting its cooperating parts. A feature of this valve is that a number of adjustments may be made therein while the device is installed in a hydraulic system in which it is to be used, these adjustments being made to suit the needs of the particular job to which the valve has been applied or to meet the requirements of the operator while the valve is in actual operation, enabling the operator to adjust the valve from time to time, when required, to secure best control over the controlled mechanisms.

It is an object of the invention to provide a selector or control valve for use in hydraulic control systems having means for adjusting its sensitiveness, and a further object of the invention is to provide a valve of this character wherein its parts may be adjusted to vary the sensitiveness of its operation while the valve is connected into a hydraulic system, and without the necessity of disassembling the valve structure.

A further object of the invention is to provide a valve of the above general character having therein chambers wherein fluid pressure may be employed to produce a reacting force against the operating lever, commonly referred to as "load feel," or to transmit to the manually controlled operating lever a force corresponding to, but larger or smaller than the "kick back" force which is imparted to the hydraulic motor or cylinder from the part operated by the motor or cylinder.

The invention is especially useful in hydraulic systems wherein a movable control member is connected to a part which is to be moved or operated so as to transmit thereto a force depending upon the force applied to the control member, and supplementary force applying means employing hydraulic fluid controlled by movement of the control member to add a booster force to the force exerted by the control member.

Further objects of the invention include the provision of a simple arrangement of parts whereby adjustment of the valve may be accomplished, and also the provision of a novel form of closure member in the valve, which closure member constitutes to the simplicity of the arrangement, whereby the adjustment of the valve structure is obtainable.

The adjustment in the valve structure for changing the relative positions of the valve closures is provided for the purpose of securing variations in the rate of pressure changes in the service ports and operating mechanisms to which the valve is connected, as the valve is operated, and/or variations in pressure relationships between inflow ports, service ports, and outflow ports.

Further objects and advantages of the invention will be brought out in the following part of the specification.

Referring to the drawing which is for illustrative purposes only,

Fig. 1 is a schematic view showing an hydraulic system embodying my invention.

Fig. 2 is an enlarged sectional view of the control valve disclosed in Fig. 1.

Fig. 3 is a cross section taken as indicated by the line 3—3 of Fig. 2.

Fig. 4 is a fragmentary perspective view of one of the closures forming a part of the valve means disclosed in Fig. 2.

Fig. 5 is a fragmentary perspective view showing an alternative form of closure.

The hydraulic system shown in Fig. 1 includes a control member shown as a lever 10 swingable upon a pin 11, this lever 10 comprising a lower section 12 and an upper or handle section 13 hinged as shown at 14 and having cooperating shoulders 15 for limiting movement of the upper section 13 relatively to the lower section 12. A spring 16, mounted at 17 on the lower section 12, engages the upper section 13 at 18, this spring tending to hold the upper section 13 in alignment with the lower section 12.

The lever 10 is directly connected to a part 19 which is to be moved. By way of example, this part 19 is shown as a control surface such as employed in aircraft. It is mounted upon a hinge or shaft 20, and has oppositely extending levers 21 connected into a cable loop 22 which is run over pulleys 23. This cable loop 22 is connected to opposite ends of a piston rod 24 which carries a piston 25 slidable in a hydraulic cylinder 26. The lever 10 has means 27 at its lower end connected to the cable loop 22 whereby force and motion may be transmitted.

A control valve 28 is mounted upon the lower section 12 of the lever 10. It has a valve actuating means 29 extending therefrom for engagement by a lever 30 which projects from the lower portion of the upper or handle section 13 of the lever 10. The source of fluid pressure is shown as a pump 31 connected by pressure piping 32 with an intermediate portion of the control valve body. Return piping 33 leads from the selector valve to a reservoir 34 which is connected to the pump by piping 35. When the handle 13 is moved in rightward direction, the lever 30 will be swung downward and the selector valve 28 will be actuated so as to deliver fluid through the delivery piping 36 to the rightward end of the cylinder 26, thereby moving the piston 25 leftward in the same direction as the lower end of the lever 10 is moved by pressure applied rightward to the handle 13, the force of the fluid under pressure in the rightward end of the cylinder 26 supplmenting the pressure applied to the cable loop 22 by the lower end of the lever 10. When the handle 13 is swung leftward from the position in which it is shown in Fig. 1, the lever 30 will be raised and the selector valve 28 will be actuated so as to deliver fluid under pressure through delivery piping 37 to the leftward end of the cylinder 26, thereby applying a rightward motivating force to the piston 25 and the cable loop 22 to which it is connected.

As shown in Fig. 2, the control valve 28 comprises a hollow body 38 preferably of cylindric form and having upper and lower end walls 39 and 40. The body 38 has an intermediate port 41 and ports 42 spaced on opposite sides thereof. These ports 42 may be referred to as end ports by reason of their placement nearer the ends of the body 38. The pressure piping 32 is shown connected to the intermediate port 41 and the ports 42 are shown connected to the return piping 33. It will be recognized that in some uses of the control valve this connection of the piping 32 and 33 to the ports 41 and 42 may be reversed.

The control valve body 38 has service port means 43 and 44 connected respectively to the delivery piping 36 and 37. The service port means 43 comprises diametrally opposed ports 45 of any suitable outline connected by a passage 46, this opposed relation of the ports 45 substantially balancing the fluid pressures radially applied through the ports against valve means which will be hereinafter described. The service port means 44 includes diametrally opposed ports 47 connected by a passage 48. It will be understood that the illustration showing diametrically opposed service ports is for descriptive purposes only, three, four, five, or more, service ports, connected by passages 46 to service port means 43 and 44 may be desirable in certain instances.

The direction of movement of the valve actuating means 29 in the normal operation of the control valve 28 is axial. It is connected to valve means 48 and axially moves such valve means 48 within the body 38 in accordance with the movement of the handle 13 relatively to the lower part 12 of the lever 10. The valve means 48 includes a valve closure 49 for cooperation with the ports 45 and a valve closure 50 for cooperation with the ports 47. The closures 49 and 50 are shown in neutral position wherein they are substantially centralized with relation to the ports 45 and 47. Each of the closures 49 and 50, as shown in Figs. 2 and 4, varies in dimension in the direction of its operative movement so as to provide two diametrally opposed narrow portions 51 and two diametrally opposed wide portions 52. The narrow portions 51, as shown in Fig. 2, have, in the direction of movement of the closure, a dimension which is less than the dimension of the ports 45 in the same direction. The wide portions 52 of each closure 49 or 50 are wider than the ports 45 or 47 with which they cooperate, so that when these closures 49 and 50 are rotated through an angle of 90° from the positions in which they are shown in Fig. 2, the wide portions 52 thereof may be brought into positions wherein they will completely close the ports 45 and 47 when the valve means 48 is in neutral position.

When the closures 49 and 50 are in the positions thereof shown in Fig. 2, hydraulic fluid will flow from the inlet port 41 to the outlet port 42, this flow passing, as indicated by arrows 53, across the mouths of the service ports 45 and 47 across the faces of the narrow portions 51 of the closures 49 and 50. When the valve means 48 is shifted downward, as a result of rightward movement of the handle 13, the closure 50 will be moved into a position obstructing the flow of fluid from the space between closures 49 and 50 into the ports 47, and at the same time the closure 49 will be moved downward with relation to the ports 45 to obstruct flow of fluid from the ports 45 to the lower outlet or return port 42, the result being that the fluid fed into the space between the closures 49 and 50 can find exit only through the ports 45 and therefore will be directed into the delivery piping 36 to the rightward end of the cylinder 26. The fluid in the leftward side of the cylinder 26 can then flow through the delivery piping 37 to the ports 47, opened to permit flow into the outlet port 42 by the downward motion of the closure 50. It will be understood that upward movement of the valve means 48 will produce a movement of the closures 49 and 50 whereby fluid will be caused to flow out through the ports 47 to the delivery piping 37, flow also being permitted from the delivery piping 36 into the outlet port 42.

The sensitiveness of the control valve depends upon the distance through which the valve means 48 must be moved in order to produce a flow of pressure fluid out through a selected service port means 43 or 44. This, in turn, is determined by the dimension of the face of the portion of the closure presented to the valve port, as compared to the dimension of the port in the direction of the movement of the closure. My invention provides means whereby the closures 49 and 50 may be moved transversely to the direction of their movement, in this instance, circumferentially, so as to bring into cooperative relation to the valve ports different and wider portions of the closures 49 and 50. It is therefore possible by rotation of the closures 49 and 50 to bring into alignment with the valve ports 45 and 47 different sections and accordingly different face dimensions of the closures 49 and 50, whereby the effective faces of the closures presented to the valve ports will be less than equal to or greater than the axial dimensions of the ports, within the limitations and variations of the closures 49 and 50.

The closures 49 and 50 are respectively mounted on sleeves 60 and 61 which are movable with relation to an axial rod. The sleeves 60 and 61 are provided with means of interengagement permitting axial movement thereof, but preventing rotation so that the closures 49 and 50 will be held in alignment. Near its lower end, the rod 62 has a threaded portion in engagement with the sleeve 60, and the downwardly projecting end of the rod 62 is provided with an engageable formation such as a nut 66, whereby rotation may be imparted to the rod. Below the threads 65 sealing means 67 is shown around the rod 62. The upwardly projecting portion of the sleeve 61, which forms a cooperative part of the valve actuating means, has a collar 70 thereon which is received in an annular cavity 71 in an attachment fitting 72 having a projecting portion 73 for connection to the lever 30, Fig. 1. The upper portion of the rod 62 has threads 75 for engagement with the sleeve 61, these threads 75 being of different pitch than the threads shown at 65 so that by rotation of the rod 62, the sleeves 60 and 61 and the closures 49 and 50 may be given relative axial movement to move them together or apart, thereby making it possible to change the spacing of the closures 49 and 50 with relation to the spacing of the service ports 45 and 47, without interference with the relative position of projecting portion 73 with respect to the service ports 45 and 47. This makes possible this adjustment of the closure spacing while the valve is in use without interference with its other functions. It is an object of this invention to provide a control valve for use in operating mechanisms wherein the adjustable features herein described may be used in connection with valve or other motions to vary the supply of fluid during valve movements in accordance with predetermined requirements by means of rotation of closures 49 and 50 during a valve motion and/or variations in spacing between closures 49 and 50, independently or simultaneously during one or a series of valve motions.

The attachment fitting 72, Fig. 2, has a chamber 80 therein carrying a worm screw 81 positioned so as to engage worm teeth 82 in the circumferential portion of the collar 70, so that by rotation of the screw 81 the valve means may be rotated so that rotative adjustment of the closures 49 and 50 relative to the ports 45 and 47 may be readily accomplished from the exterior of the selector valve and without necessity of dismantling any portion of the valve. This makes it possible to adjust the sensitivity or characteristics of operation of the valve while it is connected in place in a hydraulic system and in actual use.

In Figs. 2 and 4 I have shown closures 49 and 50 varying gradually in dimension from the narrow portions 51 to the wide portions 52 thereof. Although it might be regarded as preferable, this gradual variation in dimension of the closures may be in some instances in the use of the control valve, replaced by a stepped formation such as shown in Fig. 5. Therein I have shown a closure member 49' having narrow sections 51' and wide sections 52' with intervening sections 52a of different width in stepped arrangement between the small and large sections 51' and 52'.

A feature of my invention resides in the provision of fluid chambers 85 and 86 between the ends of the valve means 48 and the end walls 39 and 40 of the body 38. This I accomplish by forming flanges or pistons 87 and 88 on the sleeves 61 and 60 in spaced relation to the end walls 39 and 40. These fluid chambers may be employed in some instances as dash pots for control of the rate of movement of the valve means 48, but they have a special utility as means whereby reacting fluid pressure may be applied through the valve means and the lever 30 to the upper portion or handle 13 of the control member 10. In Fig. 1 I have shown a branch pipe 90 connecting the delivery piping 36 with a port 91 which communicates with the lower chamber 86. When the handle section 13 is moved rightward so as to actuate the selector valve 28 in a manner to deliver fluid under pressure through the piping 36 into the rightward end of the cylinder 26, the fluid pressure in the piping 36 will be transmitted through the branch pipe 90 to the chamber 86 wherein it will exert an upward force against the piston 88, this upward force being transmitted through the valve means 48, the valve actuating means 29, and the lever 30 to the handle section 13, thereby producing a force tending to move the handle leftward against the operating force applied rightwardly thereto by the operator. This force, referred to as load feel, will be proportionate to the force exerted against the larger piston 25 within the cylinder 26 in accordance with the ratio of the areas of the pistons 88 and 25 multiplied by the ratio of the length of the lever 30 to the length of the handle section 13. In like manner, I have shown the branch piping 95 connecting the delivery piping 37 to a port 96 which communicates with the upper chamber 85, so as to produce against the upward face of the piston 87 a force similarly proportionate to the force which may at any time exist against the left face of the piston 25. For purposes of illustration, and assuming Fig. 1 to be drawn to scale, the force exerted on the piston 25 will be about 21 times that exerted on the handle section 13. This indicates that, considering the overall leverage of the lever 10 as three and one half to one, part 19 can be operated hydraulically, by this particular arrangement, with one-sixth the manual effort on the handle section 13 as would be required if the lever 10 were not equipped with the hydraulic follow-up control. This ratio of effort can be varied within wide limits; in some instances an increase of required effort on the handle section 13 over that secured on the piston 25 might be desired. It will be understood that the illustration of the pistons 87 and 88 as of the same diameter as the closures 49 and 50 is for descriptive purposes only; design requirements may require larger or smaller diameters of the pistons 87 and 88, with correspondingly increased or decreased diameters of the valve body 38 between the ports 42 and the end walls 39 and 40. The effect of the load feel feature of this valve may be illustrated by considering the action of the control system when the closures 49 and 50 are positioned over the service ports 45 and 47 when so rotated as to completely cover said ports, in which case there will be no fluid flow and the entire system will be similar to a hydraulic jack with movements of the handle section 13 causing proportionate movements of the piston 25 with proportionate loadings on the handle section 13 to those exerted on the piston 25. This feature makes possible manual control of the part 19 over short distances with provision for use of hydraulic power for larger changes of position of the part 19; rotation of the closures providing an adjustment of the amount of manual control secured before hydraulic power is used. By constructing wider portions of the valves of sufficient width to overlap the service ports throughout the motion permitted by the stops to limit motion of the handle section 13, provision is had for limiting the motion of the mechanism, by rotation of the valves, to that of the operation permissible by motion of the handle section 13. If an external force be exerted on the part 19 of sufficient magnitude to create a pressure on the handle section 13 that is greater than the operator can hold or, in case of the operator not holding the handle section 13 and the application of a force to the part 19 of sufficient intensity to overcome the friction of the mechanism, the handle section 13 will be forced in the direction of such force, actuating the control valve 28 to permit movement of the piston 25 in the direction in which the external force on the part 19 tends to move it. This action can be applied, for instance, to the hoist control lever of a crane, making it impossible for an operator to lift a load of sufficient weight to overturn the crane. The use of load feel in connection with hydraulic follow-up or booster controls requires that the operator must hold a proportionate part of the forces exerted on or acting upon the controlled part at all times. The system herein described is reversible; if the operator does not hold the handle section 13, forces acting on the part 19 will cause motions of the part 19 in the direction of the acting forces. The design of mechanism for use of this valve should take into account the desired relationships of the forces to act on the pistons 25 and 87 and 88 in order to limit the forces on the handle section 13 to those desirable for operation by correct proportioning of the areas of the pistons 25, 87 and 88.

I claim as my invention:

1. In a control valve of the general class described, the combination of: a body having therein spaced pressure and return ports, and a pair of service ports disposed between said first named ports; actuating means extending within said body; a pair of valves disposed so as to simultaneously cooperate with said service ports and simultaneously vary the flow through said service ports, said valves receiving operating movement from said actuating means, and each of said valves having a piston-like portion defined and bounded by a pair of shoulders extending radially of said body from said actuating member, said shoulders being spaced apart in the direction of operative movement of said actuating means, said spacing of said shoulders varying in dimension in the direction of the operating movement of said valves by said actuating means; and adjusting means for moving said valves in a direction transverse to the said direction of their operating movement by said actuating means whereby portions of said valves of different width may be brought into cooperating closure relation to said service ports.

2. In a control valve of the general class described, the combination of: a body having therein spaced pressure and return ports, and a pair of service ports disposed between said first named ports; actuating means extending within said body; a pair of valves disposed to simultaneously cooperate with said service ports, said valves receiving operating movement from said actuating means, and said valves varying in dimension of service port coverage in the direction of their operating movement by said actuating means; adjusting means for moving said valves in a direction transverse to the said direction of said operating movement by said actuating means whereby said varying dimensions of the service port coverage thereof may be brought into coperating relation to said service ports; and means for effecting relative movement of said valves.

3. In a control valve of the general class described, the combination of: a cylindric body having therein spaced pressure and return ports, and a pair of service ports disposed between said pressure and return ports; actuating means extending within said body; a pair of valves to cooperate with said service ports, said valves being structurally connected to said actuating means; a driven member on said actuating means; driving means engaged with said driven member for normally restraining rotation of said valves and for operation on occasion to rotate said valves about their axial line of operating movement; and means for simultaneously effecting relative movement of said valves in equal amounts but in opposite directions by means extending outside said valve body and operable from a single control while said valve actuating means is in motion or at rest.

4. In a control valve of the general class described, the combination of: a body having therein spaced pressure and return ports, and service ports disposed between said first named ports, said service ports including a pair of diametrally placed first service ports and a pair of diametrally placed second service ports; actuating means extending within said body; a pair of valves to simultaneously cooperate with said service ports and simultaneously vary the flow through said service ports, said valves receiving operating movement from said actuating means, each of said valves having a plurality of diametrally opposed sections, each of which sections varies in dimension in the direction of the operating movement of said valves by said actuating means; and adjusting means for moving said valves in a direction transverse to the said direction of their operating movement by said actuating means whereby different sections thereof may be brought into cooperating relation to said service ports.

5. In a control valve of the general class described, the combination of: a body having therein spaced pressure and return ports, and service ports disposed between said first named ports, said service ports including a pair of diametrally placed first service ports and a pair of diametrally placed second service ports; actuating means extending within said body; a pair of valves to simultaneously cooperate with said service ports and simultaneously vary the flow through said service ports, said valves receiving operating movement from said actuating means, each of said valves having a plurality of diametrally opposed sections, each of which sections varies in dimension in the direction of the operating movement of said valves by said actuating means; adjustment means for moving said valves in a direction transverse to the said direction of said operating movement by said actuating means whereby different sections thereof may be brought into cooperating relation to said service ports; and means for effecting relative movement of said valves.

6. In a control valve of the general class described, the combination of: a valve body; valve actuating means extending therein, said actuating means being movable in opposite directions from a neutral position along a prescribed direction of movement to accomplish valve actuating movement, and said body having therein a pair of ports spaced apart in said direction of valve actuating movement, and a service port between said first named ports; a valve in said body connected to said actuating means so that when said actuating means is in said neutral position said valve will be aligned with said service port and being movable by said actuating means in said direction of movement between positions of alignment and disalignment with said service port, said valve dividing said valve body into a pair of chambers and being defined by a pair of outwardly faced shoulders spaced apart in the direction of operative movement of said actuating means, the spacing of said outwardly faced shoulders varying in dimension in the direction of movement; and means for moving said valve transversely to said direction of said operative movement whereby different portions of said valve will be brought into cooperating relation to said service port, thereby varying the flow through said service port for a given movement of said valve.

7. In a control valve of the general class described, the combination of: a cylindric body having pressure and return port means comprising an intermediate port and a pair of end ports, and a pair of service ports disposed on opposite sides of said intermediate ports and between said intermediate ports and said end ports; valve actuating means movable in a direction axially of said body; valve means in said body comprising a pair of closures, spaced apart so as to simultaneously cooperate one each with a separate one of said service ports, said valve means being movable by said actuating means in opposite directions from a position wherein said closures are simultaneously cooperatively aligned with said service ports, and each of said closures having a piston-portion defined and bounded by a pair of oppositely facing surfaces spaced apart in the direction of operative movement of said actuating means, the spacing of said surfaces varying in dimension parallel to the axis of said body; and adjusting means for rotating at least one of said closures relatively to said service ports so as to bring said different portions of said varying dimension closure into cooperation with at least one of said service ports.

8. In a control valve of the general class described, the combination of: a cylindric body having pressure and return port means comprising an intermediate port and a pair of end ports, and a pair of service ports disposed on opposite sides of said intermediate ports and between said intermediate ports and said end ports; valve actuating means movable in a direction axially of said body; valve means in said body comprising a pair of closures spaced apart so as to simultaneously cooperate, one each with a separate one of said service ports, said valve means being movable by said actuating means in opposite directions from a position wherein said closures are simultaneously cooperatively aligned with said service ports, and said closures varying in dimension parallel to the axis of said body; and adjusting means for rotating said valve means relatively to said body so as to bring different width portions of said varying dimensions closures into positions of cooperation with said service ports.

9. In a control valve of the general class described, the combination of: a cylindric body having pressure and return port means comprising an intermediate port and a pair of end ports, and a pair of service ports disposed on opposite sides of said intermediate ports and between said intermediate ports and said end ports; valve actuating means movable in a direction axially of said body; valve means in said body comprising a pair of closures spaced apart so as to simultaneously cooperate, one each with a separate one of said service ports, said valve means being movable by said actuating means in opposite directions from a position wherein said closures are simultaneously cooperatively aligned with said service ports, and said closures varying in dimension parallel to the axis of said body; adjusting means for rotating at least one of said closures relatively to said body so as to bring different portions of said closure into cooperation with at least one of said service ports; and adjusting means for simultaneously varying the axial spacing of said closures.

10. In a control valve of the general class described for connection to the fluid receiving spaces of a fluid operated device, the combination of: a cylindric body having pressure and return port means comprising an intermediate port and a pair of end ports, and a pair of service ports disposed on opposite sides of said intermediate port and between said intermediate port and said end ports; valve actuating means movable in a direction axially of said body; valve means in said body comprising a pair of closures, one each of which cooperates with a separate one of said service ports, said valve means being movable by said actuating means in opposite directions from a position wherein said closures are aligned with said service ports, and said closures varying in service port coverage dimension parallel to the axis of said body; adjusting means for rotating said closures to vary the coverage of said service ports by said closures; pistons on said valve means between said end ports and the end walls of said body to form chambers at the ends of said valve means to receive fluid; and means for transmitting varying fluid pressures from said fluid receiving spaces of said fluid operated device respectively to said chambers at the ends of said valve body.

11. In a selector valve of the general class described, the combination of: a cylindric body having pressure and return port means comprising an intermediate port and a pair of end ports, and a pair of service ports disposed on opposite sides of said intermediate ports and between said intermediate ports and said end ports; valve actuating means movable in a direction axially of said body; valve means in said body comprising a pair of closures, one each of which cooperates with a separate one of said service ports, said valve means being movable by said actuating means in opposite directions from a position wherein said closures are aligned with said service ports, and said closures varying in dimension parallel to the axis of said body; adjusting means for rotating at least one of said closures relatively to said body so as to bring different portions of said closure into cooperation with at least one of said service ports; pistons on said valve means between said end ports and the end walls of said body to form chambers at the ends of said valve means to receive fluid; and means forming ducts connecting each one of said service ports with a separate one of said chambers.

12. In a control valve of the general class described, the combination of: a cylindric body having flow port means comprised of an intermediate port or ports and a pair or pairs of end ports, and a pair or pairs of service ports disposed between said intermediate ports and said end ports; valve actuating means movable in a direction axially of said body; valve means in said body comprising a pair of closures simultaneously cooperatively aligned with said service ports, at least one of said closures having one or more sections, each of which said sections varies in dimension of service port coverage in a direction parallel to the axis of said body, each of which said variable dimension of service port coverage sections cooperates with a separate one of said service ports, said valve means being movable by said actuating means in opposite directions from a position wherein said closures are simultaneously cooperatively aligned with said service ports; and adjusting means for rotating at least one of said variable dimension of service port coverage closures relatively to said body so as to bring different width portions of said sections into cooperation with one of the said service ports.

RALPH R. PROCTOR.

CERTIFICATE OF CORRECTION.

Patent No. 2,380,705.   July 31, 1945.

RALPH R. PROCTOR.

It is hereby certified that error appears in the printed specification of the above numbered patent requiring correction as follows: Page 5, first column, line 22, claim 6, strike out the words "said operative" and insert the same before "movement" in line 20, same claim; and that the said Letters Patent should be read with this correction therein that the same may conform to the record of the case in the Patent Office.

Signed and sealed this 16th day of October, A. D. 1945.

Leslie Frazer (Seal)   First Assistant Commissioner of Patents.

of said service ports with a separate one of said chambers.

12. In a control valve of the general class described, the combination of: a cylindric body having flow port means comprised of an intermediate port or ports and a pair or pairs of end ports, and a pair or pairs of service ports disposed between said intermediate ports and said end ports; valve actuating means movable in a direction axially of said body; valve means in said body comprising a pair of closures simultaneously cooperatively aligned with said service ports, at least one of said closures having one or more sections, each of which said sections varies in dimension of service port coverage in a direction parallel to the axis of said body, each of which said variable dimension of service port coverage sections cooperates with a separate one of said service ports, said valve means being movable by said actuating means in opposite directions from a position wherein said closures are simultaneously cooperatively aligned with said service ports; and adjusting means for rotating at least one of said variable dimension of service port coverage closures relatively to said body so as to bring different width portions of said sections into cooperation with one of the said service ports.

RALPH R. PROCTOR.

CERTIFICATE OF CORRECTION.

Patent No. 2,380,705.                                            July 31, 1945.

RALPH R. PROCTOR.

It is hereby certified that error appears in the printed specification of the above numbered patent requiring correction as follows: Page 5, first column, line 22, claim 6, strike out the words "said operative" and insert the same before "movement" in line 20, same claim; and that the said Letters Patent should be read with this correction therein that the same may conform to the record of the case in the Patent Office.

Signed and sealed this 16th day of October, A. D. 1945.

Leslie Frazer (Seal)                                    First Assistant Commissioner of Patents.